Patented Jan. 6, 1925.

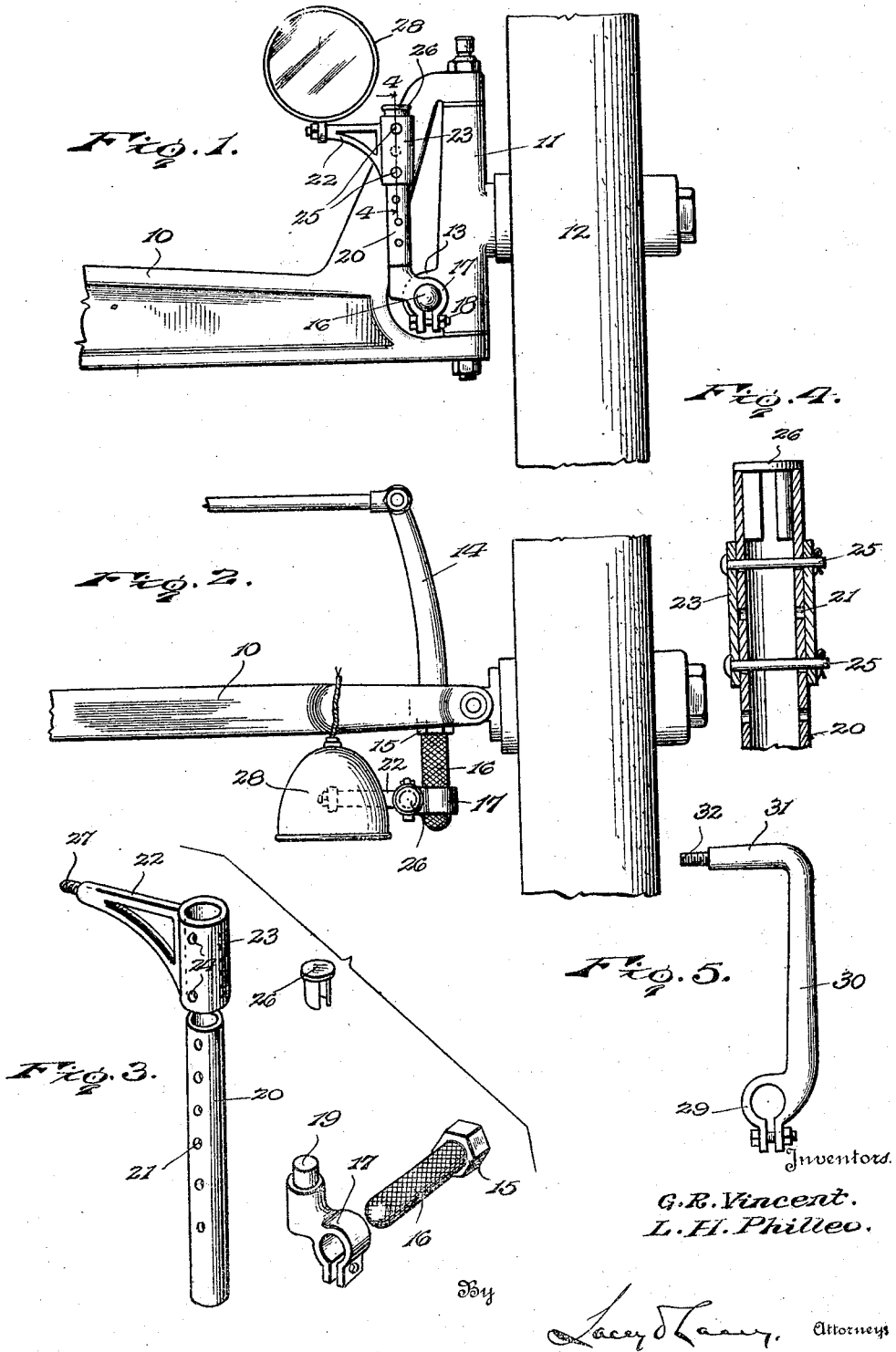

1,521,978

UNITED STATES PATENT OFFICE.

GEORGE R. VINCENT AND LEIGH H. PHILLEO, OF LOS ANGELES, CALIFORNIA.

DIRIGIBLE HEADLIGHT.

Application filed February 3, 1923. Serial No. 616,705.

*To all whom it may concern:*

Be it known that we, GEORGE R. VINCENT and LEIGH H. PHILLEO, citizens of the United States, residing at Los Angeles, in the county of Los Angeles and State of California, have invented certain new and useful Improvements in Dirigible Headlights, of which the following is a specification.

This invention relates to an improved dirigible head light for motor vehicles and seeks, as one of its principal objects, to provide a device of this character which may be mounted upon the steering knuckles of the front wheels of a vehicle so as to be swung as the wheels are guided.

The invention has as a further object to provide a headlight which, by being mounted at a low level upon the vehicle will not blind passing traffic as do ordinary headlights.

And the invention has a still further object to provide a headlight which will be characterized by structural simplicity and which may be readily applied.

Other and incidental objects will appear hereinafter.

In the drawing:

Figure 1 is a fragmentary front elevation showing our improved headlight applied to the steering knuckle of a Ford vehicle, Figure 2 is a top plan view of the device, Figure 3 is a perspective view showing the device in detail, the parts being disassembled, Figure 4 is a fragmentary sectional view showing the mounting of the bracket arm of the device upon the supporting post therefore, and Figure 5 is a detail elevation showing a slightly modified form of bracket.

Referring now more particularly to the drawing, we have shown our improved headlight in connection with a steering knuckle of a Ford vehicle and shall so describe the invention. However, we do not wish to be limited in this regard since the device is well adapted for use in connection with other makes of vehicles and will prove entirely efficient wherever found applicable. The front axle of the vehicle is indicated at 10 and the steering knuckle at the adjacent end of the axle at 11, this steering knuckle carrying one of the front wheels 12.

Near its lower end the knuckle 11 is provided with a lateral ear 13 and extending at its forward end through said ear is one of the steering arms 14 of the vehicle.

In carrying the invention into effect, we employ a nut 15 which, at its outer side, is formed with a cylindrical extension or post 16. As is well known, the bracket arm 14 is normally secured to the ear 13 of the steering knuckle by a nut threaded upon the forward end of said arm. This nut is removed and the nut 15 substituted in lieu thereof so that, as best shown in Figure 2, the post 16 projects horizontally forward at the front side of the steering knuckle while, at the same time, the nut 15 serves to connect the steering arm to said knuckle. Detachably mounted upon the post 16 of the nut is a lamp bracket including a split clamp 17 secured upon the post by a clamping bolt 18, the post being preferably knurled to prevent slipping of said clamp. Rising from the clamp is a stud 19 and brazed or otherwise secured upon said stud is an upstanding tubular shank 20 in which are formed oppositely disposed vertically spaced openings 21. Adjustable vertically upon said shank is a bracket arm 22 provided at its inner end with a sleeve 23 slidably fitting over the shank and formed in said sleeve near its ends are openings 24. As shown in Figure 4, these openings are adapted to be brought into register with the openings 21 in the shank and engaged through the shank and said sleeve are bolts 25 securing the bracket arm in vertically adjusted position upon the shank. Closing the shank 20 at its upper end is a removable cap 26 which is applied after the bracket arm is arranged in position and formed on said arm at its outer end is a stud 27 upon which is bolted a lamp 28. This lamp may be of any appropriate design but is adjustable upon the stud so that the lamp may be tilted at any preferred angle.

As will now be readily understood in view of the preceding description, when the steering knuckle 11 of the vehicle is rotated for swinging the front wheels of the vehicle to guide the vehicle, the lamp 28 will be swung with said wheels so that the rays from the lamp will be directed in the path of the vehicle and, of course, a pair of the headlights will preferably be employed in connection with the vehicle so that the roadway will be well illuminated. By vertically adjusting the bracket arm 22 of the device, as previously described, the lamp may be raised or lowered with respect to the roadway and, as will be perceived, the lamp will, in any event, be arranged at a relatively low elevation so that the headlight will not blind passing traffic. We accordingly provide a particularly simple and efficient device for the purpose set forth and, as will now be seen, a device which may be readily applied without the necessity for any structural change in the vehicle.

In Figure 5 of the drawing, we have illustrated a slightly modified form of lamp bracket. In this modification, the bracket is an integral structure and comprises a clamp 29 corresponding to the clamp 17 of the preferred construction. Rising from said clamp is a shank 30 at the upper end of which is a laterally directed bracket arm 31 provided at its free end with a stud 32, the stud being adapted to accommodate a lamp. In some instances, the integral bracket may be found entirely adequate.

Having thus described the invention, what is claimed as new is:

A dirigible headlight for motor vehicles including a nut for attachment to a steering arm and provided with an extension forming a post, a clamp embracing the post and adjustable along the post as well as about the axis thereof, a shank rising from said clamp, a sleeve slidable upon the shank and provided with a bracket arm, a pin extending through the sleeve and shank securing the sleeve in adjustably elevated position upon the shank, and a lamp mounted for independent swinging adjustment on said arm.

In testimony whereof we affix our signatures.

GEORGE R. VINCENT. [L. S.]
LEIGH H. PHILLEO. [L. S.]